C. G. TIEFEL.
CHECK WRITER.
APPLICATION FILED DEC. 17, 1917. RENEWED JULY 26, 1920.

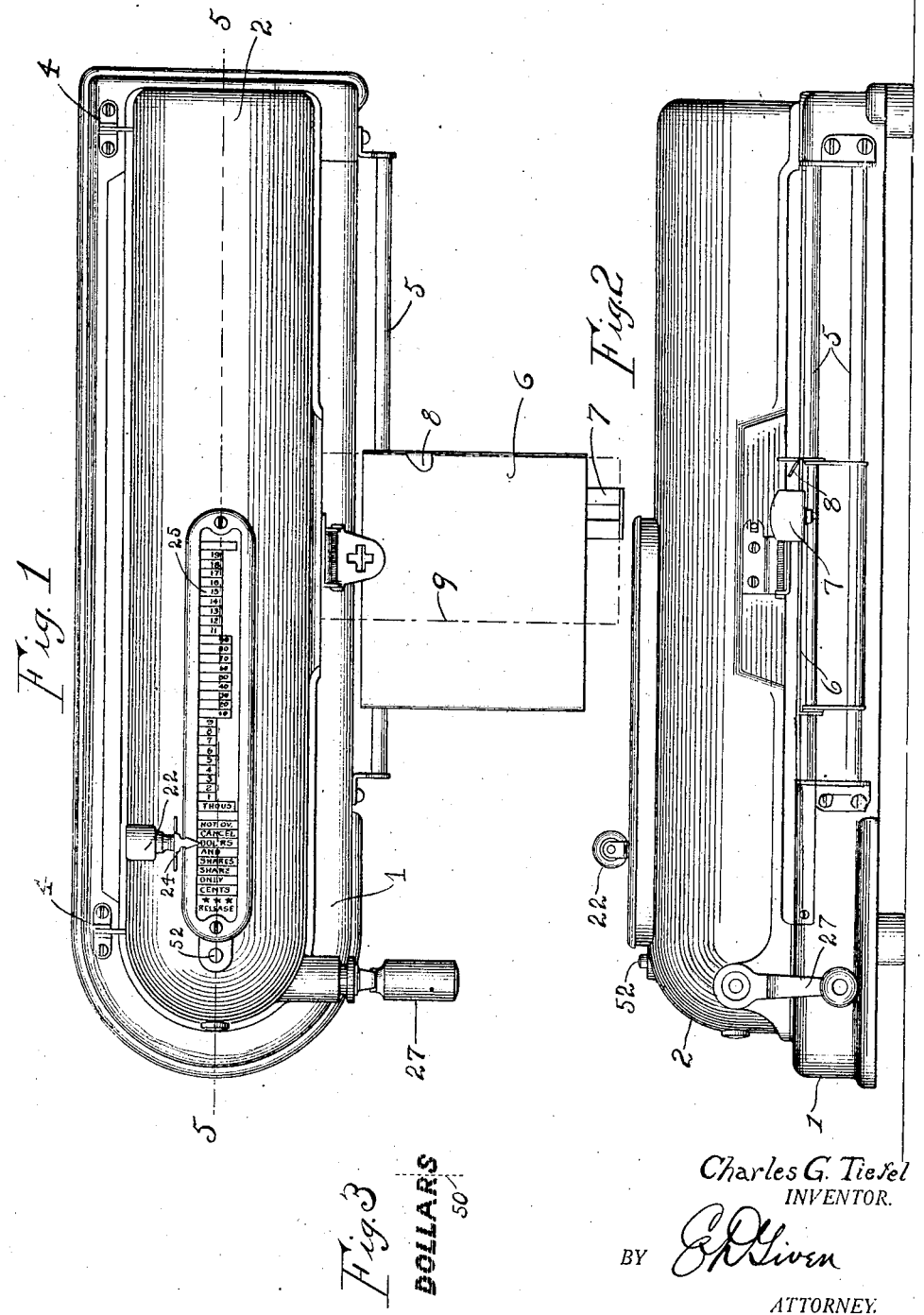

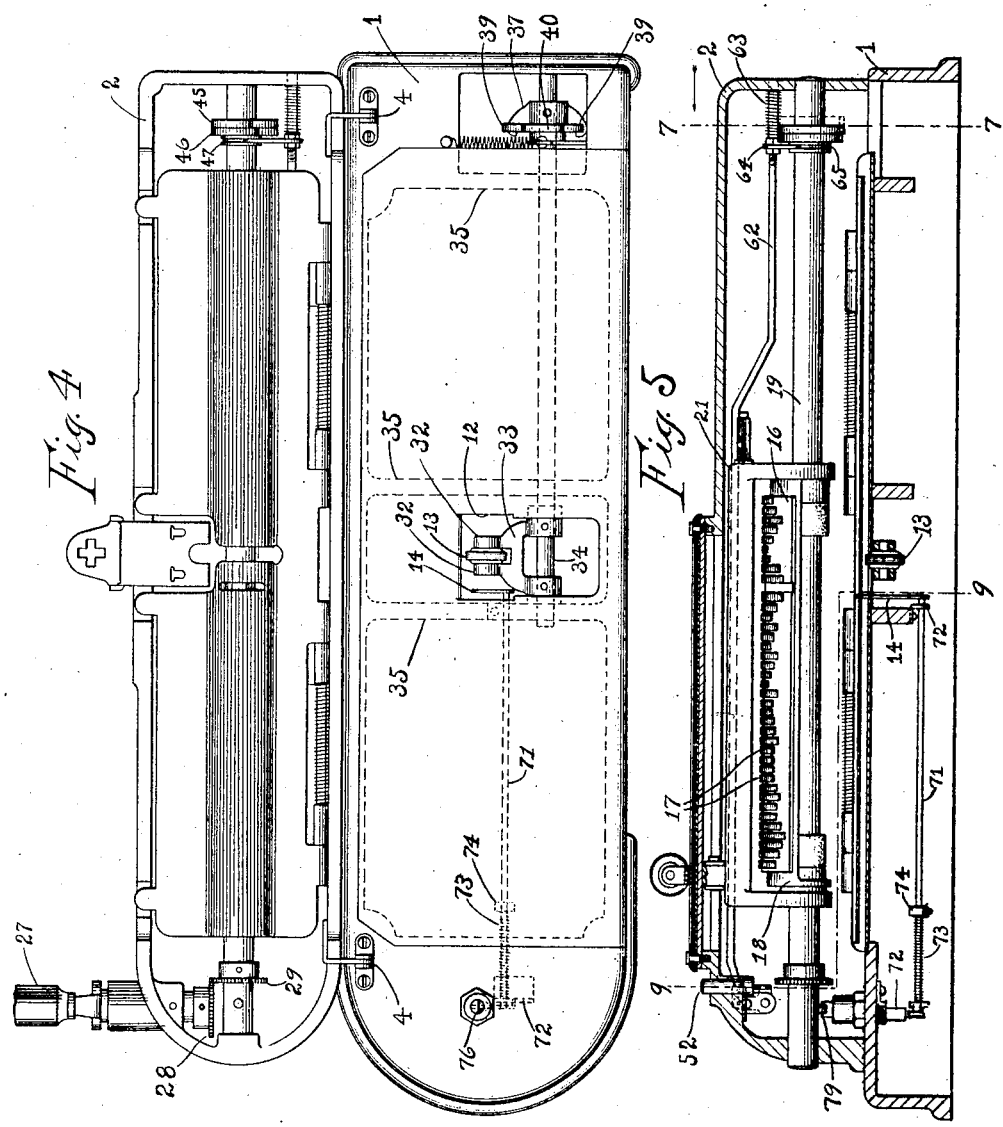
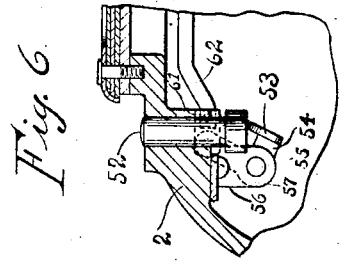

1,353,437.

Patented Sept. 21, 1920.
3 SHEETS—SHEET 3.

Charles G. Tiefel
INVENTOR.

BY E. D. Givin
ATTORNEY.

UNITED STATES PATENT OFFICE.

CHARLES G. TIEFEL, OF ROCHESTER, NEW YORK, ASSIGNOR TO TODD PROTECTOGRAPH COMPANY, INC., OF ROCHESTER, NEW YORK, A CORPORATION OF NEW YORK.

CHECK-WRITER.

1,353,437.     Specification of Letters Patent.     Patented Sept. 21, 1920.

Application filed December 17, 1917, Serial No. 207,503. Renewed July 26, 1920. Serial No. 399,158.

*To all whom it may concern:*

Be it known that I, CHARLES G. TIEFEL, of Rochester, in the county of Monroe and State of New York, have invented certain new and useful Improvements in Check-Writers; and I do hereby declare the following to be a full, clear, and exact description of the same, such as will enable any person skilled in the art to which the invention appertains to make and use the same.

My invention relates generally to machines for printing on checks and other commercial documents a limiting value to prevent them from being "raised" or altered by changing their face values to make them appear to have a greater value than they were originally intended to have, and has particular reference to what are known in the art as full word machines; that is, machines in which the amounts are written out in words with other words such as "dollars" and "cents" to indicate the denominational values.

A broad object of the invention is to provide machines of the type mentioned with manipulatively controlled means whereby all or a part of a word may be printed.

A more specific object is to provide mechanism whereby the duration of the feeding and printing action of a printing and feeding couple may be variably controlled.

Another object of the invention is to provide a machine lock which will prevent operation of the machine unless a check or other instrument is properly inserted to be acted upon by the printing and feeding couple.

With these and incidental objects in view the invention consists in certain novel features of construction and combinations of parts, the essential elements of which are set forth in appended claims and a preferred form of embodiment of which is hereinafter described with reference to the drawings which accompany and form a part of this specification.

Of said drawings,

Figure 1 is a top plan view of the illustrative machine.

Fig. 2 is a right side view of the machine.

Fig. 3 is a diagram representing how all or part of the word "dollars" may be printed.

Fig. 4 is a top plan view of the illustrative machine with the top open to expose parts of the improved mechanism to view.

Fig. 5 is a section on the line 5—5 of Fig. 1.

Fig. 6 shows the positions assumed by the manipulative device and connections actuated thereby to cause a part only of a word to be printed.

Figure 7:
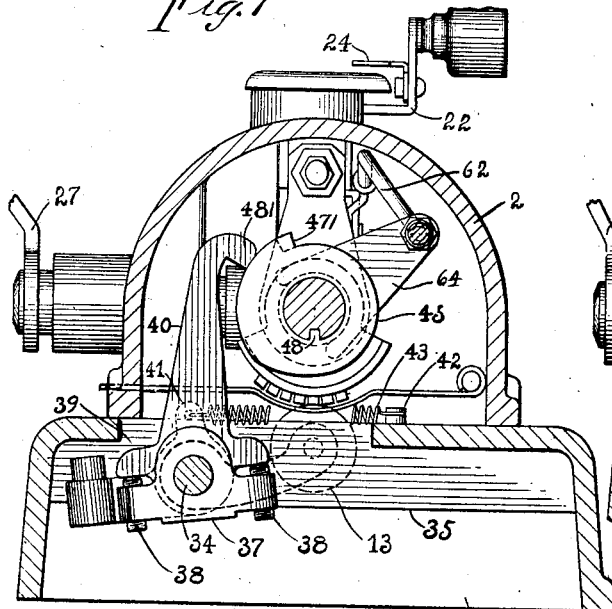
Fig. 7 is a vertical cross section through the machine on the line 7—7 of Fig. 5.

The improvements are shown applied to a machine of the kind illustrated and described in United States Letters Patent No. 1,138,330, issued May 4, 1915, to L. M. Todd and C. G. Tiefel. Such a machine has a type carrier which may be moved from one position to another to determine which of a number of words is to print, after which the type carrier is given a rotation to carry the different letters or characters of the word past common printing point.

Coöperating with the type at the printing point is a platen which is moved to coöperating position at about the time the first letter of the word reaches the printing point. The platen is held in coöperating position long enough for it to coöperate with the last letter of the longest word that the machine is constructed to print. This function of moving the platen into coöperative position and retaining it in such position is performed by a cam which makes a complete rotation at each operation.

The improvement upon the mechanism just described consists in providing two cams, one which will maintain the platen in coöperating position until the last letter of the word is printed, while the other cam is a trifle shorter so as to permit the platen to move out of coöperating relation just before the last letter of the word arrives at the common printing point.

A manipulative device is provided for determining which of the two cams is to be effective during the operation. This manipulative device operates through suitable connections to shift the pair of cams, just mentioned, so that either of them may be effective when the machine is operated. For example, if the word "cent" should be printed instead of "cents", the manipulative device is called into play so as to bring the shorter of the two cams in effective position and as soon as the next to the last letter of the word has been printed, the platen is released so that the final "s" is not printed. As an incident to this release of the platen, the feed of the work is also stopped, the way in which this is accomplished being explained later on. It will be seen, therefore, that the manipulative device not only controls the printing, but that it also controls the paper feed.

The machine lock, before mentioned, is so devised as to be very sensitive to impulses imparted by inserting paper or other record material, so that even if the material is not very stiff, the lock will still operate satisfactorily. The Todd and Tiefel machine to which, as previously stated, the improvements are shown applied has a central shaft which makes a complete rotation at each operation. In the improved machine this shaft carries a stud which, when the machine lock is in effective condition, is engaged by a locking plunger. When a check or other paper is inserted this plunger is moved down out of the way of the stud so that the operating shaft is free for rotation.

Describing the machine in detail and with reference to the drawings, part of the mechanism is inclosed in a base 1 and the rest in a top 2 which is hinged at 4 (Fig. 1) to the base. Fig. 4 shows the hinged top 2 swung open to expose the top of the base 1. This top of the base is suitably constructed to serve as a printing bed or table for the work. Rods 5 (Figs. 1 and 2) carry an adjustable table 6 provided with suitable gages 7 and 8 to assist in placing the work in correct position. The broken line 9 (Fig. 1) indicates the position of the check when inserted ready to be written.

The top of the base 1 is cut out as shown at 12 (Fig. 4) to provide an opening through which a platen 13, forming part of the printing and feeding mechanism, and a lever 14, forming a part of the machine locking mechanism, may coöperate with the paper and type. The platen 13 has grooves extending around its periphery, the purpose of this grooved construction being referred to more specifically later on.

The type to be printed from are on a plate or carrier 16, there being a line of type (designated generally by the numeral 17) for each word that the machine is constructed to print. The type carrier 16 is attached to a yoke 18 which is so mounted upon a shaft 19 as to be movable endwise along the shaft, but still prevent the shaft form rotating independently of the yoke.

Spanning the yoke 18 is a larger yoke 21 provided with a handle 22 by means of which it may be slid along the shaft 19 and thereby move the smaller yoke 18 to bring any desired line of type 17 above the platen 13. The handle 22 carries a pointer 24 coöperating with a scale 25 to assist the operator in correctly positioning the type carrier to print the different words desired.

After the type carrier 16 has been set to print a word, the shaft 19 is given a rotation by means of a crank 27 acting through gears 28 and 29. At a certain point in the operation, the platen 13, which is normally down out of the road so as to permit the paper to be freely inserted, is swung up so that as the type carrier 16 is rotated, the type will coöperate with the platen 13 to grip and feed the paper. The faces of the type are grooved so as to conform to the grooving of the platen 13, the result being that the words printed are shredded into the paper to make alteration very difficult if not absolutely impossible.

The platen 13 is rotatably mounted betwen arms 32 formed on the frame 33 fastened to a rock shaft 34 journaled in cross ribs 35 of the base 1. Fastened to the rear end of the shaft 34 is a casting 37 provided with adjusting screws 38 engaging shoulders 39 on an arm 40 loose on the shaft 34. Rigid with the arm 40 is a shorter arm 41 between which and a stud 42 is stretched a spring 43. The tension of the spring 43 normally holds the upper end of the arm 40 in engagement with the periphery of a cam 45. Rigid with the cam 45 is a cam 46 and a collar 47, the two cams and the collar forming a unit splined as at 48 on the shaft 19. The splined construction is such that the cams and collar may be moved slightly endwise of the shaft 19 but any rotative movement of the shaft will be imparted to the cams and collar.

As stated, the arm 40 is normally in engagement with the cam 45. This cam will, as the shaft 19 is turned, coöperate with the arm 40 to swing the platen 13 up to effective position and hold it in effective position until the last letter of the word to be printed has been carried by the platen. As the last letter passes the platen, the shoulder 471 of the cam 45 is carried past the nose 481 of the arm 40, whereupon the spring 43 swings the arm 40 and platen 13 clockwise (Fig. 7) thereby ending the printing feeding movement of the paper and freeing the paper for removal in case the printing has been completed. If, however, the word "dollar", for example, is to be printed instead of the word "dollars", the cams 45 and 46 are moved along the shaft 19 to bring the cam 46 in position to coöperate with the nose 481 of the arm 40. The cam 46 has a shoulder 49 which, as will be seen by referring to Figs. 7 and 8, will release the arm 40 and platen 13 sooner than the shoulder 471 on the cam 45. In the case of printing the word "dollar" therefore, as soon as the "r" has coöperated with the platen 13, the shoulder 49 will release the arm 40 whereupon the spring 43 will immediately drop the platen 13 and thereby prevent the "s" from being printed. The point where the division occurs is indicated by the dotted line 50 in Fig. 3.

Figure 8:
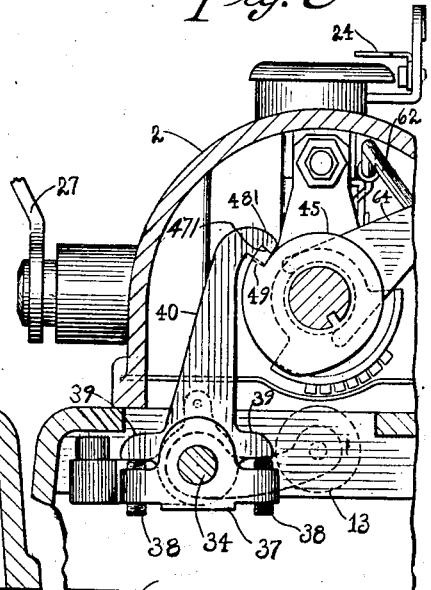
Fig. 8 is the same as Fig. 7 except that it shows the relative positions of the parts at a later point in an operation.

The mechanism for sliding the cams 45 and 46 on the shaft 19 comprises a plunger 52 slidably mounted in the upper casing 2 and resting upon the laterally extending portion 53 of a bell crank 54 pivoted at 55 to a bracket 56 secured to the casing 2. The upwardly extending arm 57 of the bell crank 54 has a slot and pin connection with a plunger 61 mounted in the casing 2 and fastened to the forward end of a rod 62. The rod 62 is bent at different points in its length so as to clear the rest of the mechanism and is slidably mounted at its rear end in the wall of the casing 2. A spring 63 tends at all times to thrust the rod 62 toward the front of the machine. Fastened to the rod 62 near its rear end is an element 64 having its end slotted as shown in Fig. 7 to engage the bottom of a groove 65 (Figs. 4 and 5) in the periphery of the collar 47 rigid with the cams 45 and 46. The construction is such that when the plunger 52 is pushed down, it will rock the bell crank 54 clockwise (Figs. 5 and 6) to the position shown in the figure last mentioned, thereby thrusting the rod 62 rearward and, because of the engagement of the element 64 with the collar 47, slide the cams 45 and 46 rearward far enough to bring the shorter cam 46 in position to coöperate with the arm 40. Then, when the shaft 19 is turned, the shoulder 49 of the cam 46 will release the platen before the last letter of the word can be printed.

Figure 9:
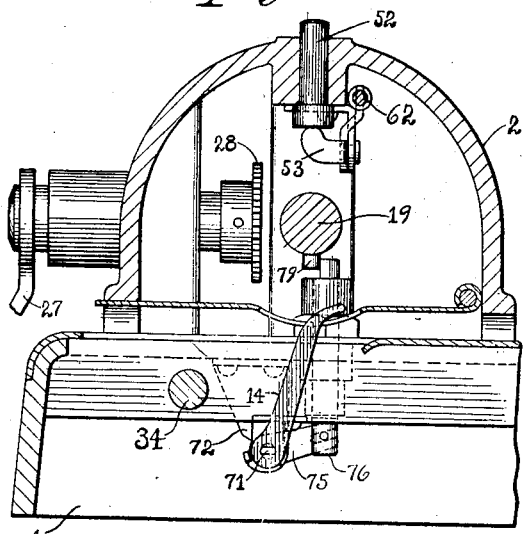
Fig. 9 is a section on the line 9—9 (Fig. 5) with the machine lock in effective condition.
Figure 10:
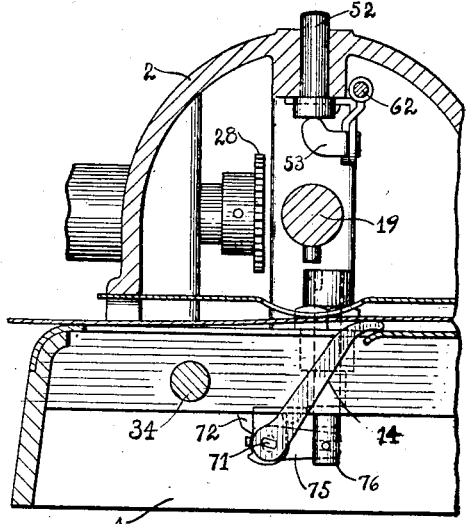
Fig. 10 is the same as Fig. 9 except that it shows the machine lock in ineffective condition due to the work having been inserted in feeding and printing position.
Figure 11:
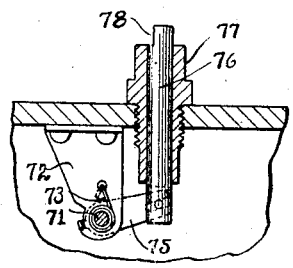
Fig. 11 is a detail of the machine locking plunger and some of the connections by which it is moved to ineffective position by the insertion of paper to be printed and fed.

The machine lock comprises the arm 14, previously mentioned, this arm being fastened to a shaft 71 journaled in one of the ribs 35 and in a bracket 72 attached to the underside of the machine base. A torsion spring 73 is secured at one end to the bracket 72 and at the other end to a block 74 fastened to the shaft 71. Fastened to the forward end of the shaft 71 is an arm 75 having a slot and pin connection with a plunger 76 slidably mounted in a bushing 77 screwed into the casing 1. The tension of the spring 73 normally holds the plunger 76 up in about the position shown in Figs. 9 and 11, in which position a flat face 78 at the upper end of the plunger is in the path of a stud 79 (Fig. 9) on the rotation shaft 19. Normally the arm 14 is in the position shown in Fig. 9, but when paper is inserted, the paper engages the arm 14 and presses it down to the position shown in Fig. 10. This movement of the arm 14 is transmitted through the shaft 71 to the plunger 76 thereby drawing the plunger down to carry its shoulder 78 out of the path of the stud 79 so that the plunger will no longer interfere with movement of the shaft 19.

In describing the construction of the improved features it has been necessary incidentally to explain fully the method of operation. It is thought, therefore, that the usual résumé of the operation may be omitted.

While the form of mechanism herein shown and described is admirably adapted to fulfil the objects primarily stated, it is to be understood that it is not intended to confine the invention to the one form of embodiment herein shown and described but that it is susceptible of embodiment in various forms all coming within the scope of the claims which follow.

What I claim is—

1. In a machine of the class described, the combination with a type carrier provided with lines of type to print words of different lengths, of means whereby all or a part of any desired word may be printed, and a manipulative device controlling said means.

2. In a machine of the class described, the combination with a type carrier provided with lines of type to print words of different lengths, of a platen coöperating with the type, manipulative means, and devices controlled by the manipulative means and in turn controlling the platen to print all or a part of any desired word.

3. In a machine of the class described, the combination with a type carrier provided with lines of type for printing words of different lengths, of a platen, means for moving the type carrier to position the desired line of type opposite the platen, and means for preventing the platen from coöperating with all of the type in the type line.

4. In a machine of the class described, the combination with a type carrier provided with lines of type for printing words of different lengths, of a platen, an invariably moved operating shaft, means actuated by said shaft for establishing coöperating relationship between the platen and type, and manipulative devices whereby the duration of such relationship may be varied to print all or part of a word.

5. In a machine of the class described, the combination with a type carrier provided with lines of type for printing words of different lengths, of a platen, an invariably moved operating shaft, cams of different lengths on said shaft for establishing printing relationship between the platen and type, one cam causing all of a word to be printed and the other a part only of a word, and manipulative means for determining which of said cams is to be effective.

6. In a machine of the class described, the combination with an invariably moved operating shaft, of a pair of cams slidable on said shaft, one of the cams being longer than the other, of a platen, an operating arm for the platen, said arm normally being in working engagement with the longer cam, and means for sliding the cams on the operating shaft to move the shorter cam in engagement with the platen operating arm.

7. In a machine of the class described, the combination with a work feeding couple, of a plurality of cams of different lengths, connections actuated by the cams for rendering the feeding couple effective, and manipulative means for shifting the cams to render the desired cam effective.

8. In a machine of the class described, the combination with an invariably moved main operating shaft, of a lock normally preventing rotation of the shaft, a printing couple actuated at each movement of the operating shaft, and means whereby insertion of the work between the printing couple renders the aforesaid lock ineffective.

9. In a machine of the class described, the combination with a feeding and printing couple, of an invariably moved main operating shaft, connections whereby movement of said shaft actuates the feeding and printing couple, a stud on said shaft, a movable stop normally in the path of said stud thereby preventing rotation of the shaft, and devices whereby insertion of the work between the feeding and printing couple will withdraw the aforesaid stop from the path of the stud.

10. In a machine of the class described, the combination with a type carrier provided with lines of type to print words, of means whereby all or a part of any desired word may be printed, and manipulative devices controlling said means.

11. In a machine of the class described, the combination with a type carrier provided with lines of type for printing words, of a platen, means for setting the type carrier to position the desired line of type opposite the platen, and means for preventing the platen from coöperating with all of the type in the type line.

12. In a machine of the class described, the combination with a type carrier provided with lines of type, of a platen, means for effecting relative movement of the type and platen to determine the line to be printed from, and means for preventing the platen from coöperating with all of the type in said line.

13. In a machine of the class described, the combination with a printing couple, of mechanism for effecting printing operations of said couple, a lock normally preventing operation of said mechanism, an element engaged and moved by the work when the work is inserted between the printing couple, and connections whereby movement of said element renders the lock ineffective.

In testimony whereof I affix my signature.

CHARLES G. TIEFEL.